(12) United States Patent
Thompson et al.

(10) Patent No.: US 8,477,448 B2
(45) Date of Patent: Jul. 2, 2013

(54) ENVIRONMENTAL CONDITIONS BASED TAPE CLEANING

(75) Inventors: Nathan Christopher Thompson, Boulder, CO (US); Matthew Thomas Starr, Lafayette, CO (US)

(73) Assignee: Spectra Logic Corporation, Boulder, CO (US)

( * ) Notice: Subject to any disclaimer, the term of this patent is extended or adjusted under 35 U.S.C. 154(b) by 0 days.

(21) Appl. No.: 13/537,135

(22) Filed: Jun. 29, 2012

(65) Prior Publication Data

US 2012/0320472 A1 Dec. 20, 2012

Related U.S. Application Data

(63) Continuation of application No. 13/523,840, filed on Jun. 14, 2012.

(60) Provisional application No. 61/497,051, filed on Jun. 14, 2011, provisional application No. 61/501,077, filed on Jun. 24, 2011.

(51) Int. Cl.
G11B 15/68 (2006.01)
(52) U.S. Cl.
USPC .......................................... 360/92.1

(58) Field of Classification Search
USPC ................ 360/92.1, 132; 719/318, 321, 322, 719/327
See application file for complete search history.

(56) References Cited

U.S. PATENT DOCUMENTS

| 4,970,748 | A  | * | 11/1990 | Rubey ............................ 15/97.1 |
| 5,144,513 | A  | * | 9/1992 | Gadsby et al. ................ 360/137 |
| 5,495,371 | A  | * | 2/1996 | Munemoto et al. ............ 360/71 |
| 7,289,292 | B2 | * | 10/2007 | Kotaki et al. ................ 360/92.1 |
| 7,724,472 | B2 | * | 5/2010 | Biskeborn et al. ............ 360/128 |
| 2012/0039002 | A1 | * | 2/2012 | Saliba ........................... 360/132 |
| 2012/0320470 | A1 | * | 12/2012 | Thompson et al. ............ 360/15 |
| 2012/0320472 | A1 | * | 12/2012 | Thompson et al. ........... 360/132 |
| 2013/0013268 | A1 | * | 1/2013 | Woolf et al. ..................... 703/1 |

* cited by examiner

*Primary Examiner* — Angel Castro
(74) *Attorney, Agent, or Firm* — Kenneth Altshuler

(57) ABSTRACT

A tape cartridge library that is equipped with a cleaning device is described. The tape cartridge library essentially includes a plurality of tape cartridges each possessing recording tape media. A plurality of tape drives that read and write data to and from each of the tape cartridges. A tape cleaning drive incapable of transferring data to and from the recording tape media which is independent of the tape drives, the tape cleaning drive disposed entirely within the tape cartridge library. The tape cleaning drive automatically receives one of the tape cartridges and cleans its respective recording tape medium when a predetermined reason for cleaning the tape cartridge is justified.

20 Claims, 14 Drawing Sheets

ENVIRONMENTAL CONDITIONS BASED TAPE CLEANING

CROSS-REFERENCE TO RELATED APPLICATIONS

This application is a continuation of U.S. Ser. No. 13/523,840 entitled Tape Cleaner, filed Jun. 14, 2012, which claims priority to and the benefit of U.S. Provisional Patent Application No. 61/497,051 entitled: Tape Cleaner, filed on Jun. 14, 2011, the entire disclosure of which is hereby incorporated by reference and Provisional Patent Application No. 61/501,077 entitled: Tape Cleaner, filed on Jun. 24, 2011, the entire disclosure of which is hereby incorporated by reference.

BACKGROUND OF THE INVENTION

1. Field of the Invention

The present invention relates generally to tape cleaning devices used in tape libraries.

2. Description of Related Art

Magnetic tape is essentially a multiple layered ribbon generally comprising a substrate that supports a magnetic layer surface atop an under layer coating. The tape surface is lubricated to improve frictional robustness between the tape surface and a read/write head, which transfers data to and from the tape as the tape moves under the read/write head, the tape being wound between two reels. As the tape moves under the read/write head, an air bearing is created between the read/write head and the tape surface, thus creating an air gap, which in a perfect world induces consistent data pulses and essentially eliminates any wear between the tape and the read/write head.

Data is stored in the magnetic layer by way of retaining magnetic polarity changes (magnetic pulses) induced by the write element in a read/write head. As the tape traverses under the read/write head the pulses are sensed via the read sensor and with the use of a timer, the pulses are resolved as 1's and 0's known as digital data bits. The air gap created by the air bearing provides a consistent spacing between the read/write head and the tape to repeatedly write the digital data bits predictably.

In the real world, however, when the tape is read, occasional data bits are missing. This can be due to a variety of reasons including foreign material on the surface of the tape, which can interrupt the air bearing spacing, thus compromising a predictable data write or read. Examples of foreign material include particulate debris on the tape, smudge on the tape, oxide build-up due to micro-corrosion of the magnetic layer, etc. Recovery of the corrupt or missing data bits is commonly accomplished with error code detection and error code correction (ECC) schemes, which are mathematical predictions of expected data, such as a hash function or checksum routine, for example. Likewise, extensive error rate detection can be an indicator that the spacing set up by the air bearing is compromised, perhaps due to a magnetic tape which has foreign material build-up. If foreign material build-up is the culprit to extensive error rate detections, restoring consistent spacing can, in some cases, solve the problem. Accordingly, the removal of foreign material build-up can be accomplished by way of tape cleaning techniques, such as wipe-downs, burnish heads or blades run over the surface of the tape. Such techniques are performed in clean room environments by dedicated independent machines.

It is to innovations related to this subject matter that the claimed invention is generally directed.

SUMMARY OF THE INVENTION

The present embodiments generally relate to a cartridge-based library that comprises at least one tape cleaning device used with intelligent clean algorithms to provide enhanced data robustness and longevity of tape cartridges.

Some embodiments of the present invention contemplate a tape cartridge library comprising: a plurality of tape cartridges; a plurality of tape drives each adapted to form a cooperating relationship with one of the tape cartridges to perform storage operations; a tape cleaning device, entirely within the tape cartridge library, adapted to automatically receive one of the tape cartridges and made to clean recording tapemedia possessed by the tape cartridge when a predetermined reason for cleaning the tape cartridge is justified. Certain other embodiments contemplate moving a tape cartridge to and from the cleaning device via a robotic tape transporter. Other embodiments contemplate the predetermined reason is justified when a counter device indicates that the tape cartridge reaches a predetermined limit of load events, the counter device keeps track of each of the tape cartridge load events, whereby each of the load events occurs when one of the tape cartridges is loaded in one of the tape drives to form the cooperating relationship; optionally, the counter device is reset to reflect that the first tape cartridge has been cleaned. Other embodiments contemplate the predetermined reason is justified when a time keeping device indicates that the tape cartridge reaches a predetermined time limit from when the tape was either new or had last been cleaned. Yet other embodiments contemplate the predetermined reason is justified when error detections of data being read during the storage operations reaches a predetermined error correction limit, wherein the predetermined limit is based on a tally of the error detections made during a present storage operation on the tape cartridge in addition to a history of error corrections of the tape cartridge is retained in non-volatile storage, or optionally, wherein the history of error code corrections are retained in a medium auxiliary memory device comprised by the tape cartridge, or optionally, wherein the predetermined error correction limit is based on a collective tally of the error corrections from at least two of the tape cartridges, or optionally, wherein the predetermined error correction limit is number of error corrections in an isolated area on the recording tapemedia, or optionally, wherein the predetermined error correction limit is reached on the tape cartridge. In addition to the tape cartridge targeted for cleaning, only proximal tape cartridges are cleaned via the tape cleaning device.

Other embodiments contemplate the predetermined limit is set by a user of data, or is set by a user of data by way of a graphical user interface. Other embodiments contemplate an alarm system that alerts a user of data indicating that the tape cartridge is targeted to be cleaned. Other embodiments contemplate report transmitting to a user of data (a) an account of all tape cartridges that have been cleaned and/or (b) a schedule of tape cartridges that are going to be cleaned. Yet other embodiments contemplate report transmitting to a user of data (a) an account of all tape cartridges that have been cleaned and why.

Yet some embodiments of the present invention contemplate a tape cartridge library comprising: a plurality of tape cartridges; a plurality of tape drives each adapted to form a cooperating relationship with one of the tape cartridges to perform storage operations; at least one environmental sensor adapted to sample an environmental condition within the tape cartridge library; a tape cleaning device, entirely within the tape cartridge library, adapted to automatically receive one of the tape cartridges and made to clean recording tape media possessed by the tape cartridge when the sample of the environmental condition exceeds a predetermined threshold.

Other embodiments contemplate the environmental condition is temperature based, i.e., the temperature within the library is either too high, or too low, for example. Such a measurement can be made via a temperature sensor. Yet other embodiments contemplate the environmental condition being an out of range humidity, which can be sensed with a humidity sensor. Yet other embodiments contemplate the environmental condition being an out of range particle count (excessive parts per million) or excessive chemical contamination (damaging chemicals that exceed parts per million, for example), which can be sensed via a particle sensor or a chemical sensor, respectively, for example. Further embodiments contemplate the environmental conditions being related to excessive shock and/or vibration, which can be sensed via one or more shock and/or vibration sensors. It is contemplated that tape cartridges can be cleaned automatically or initiated manually based on an alert. It is further contemplated that prior to cleaning any tape cartridges, the condition which exceeded whatever environmental predetermined threshold was set is resolved first so to avoid exposing cleaned tapes to the same problem. Hence, if the library is found contaminated with excessive particles or something is out-gassing, the library can be cleaned first. If the library is overheating, it can be fixed prior to initiating a tape clean, for example.

DETAILED DESCRIPTION

Figure 1:
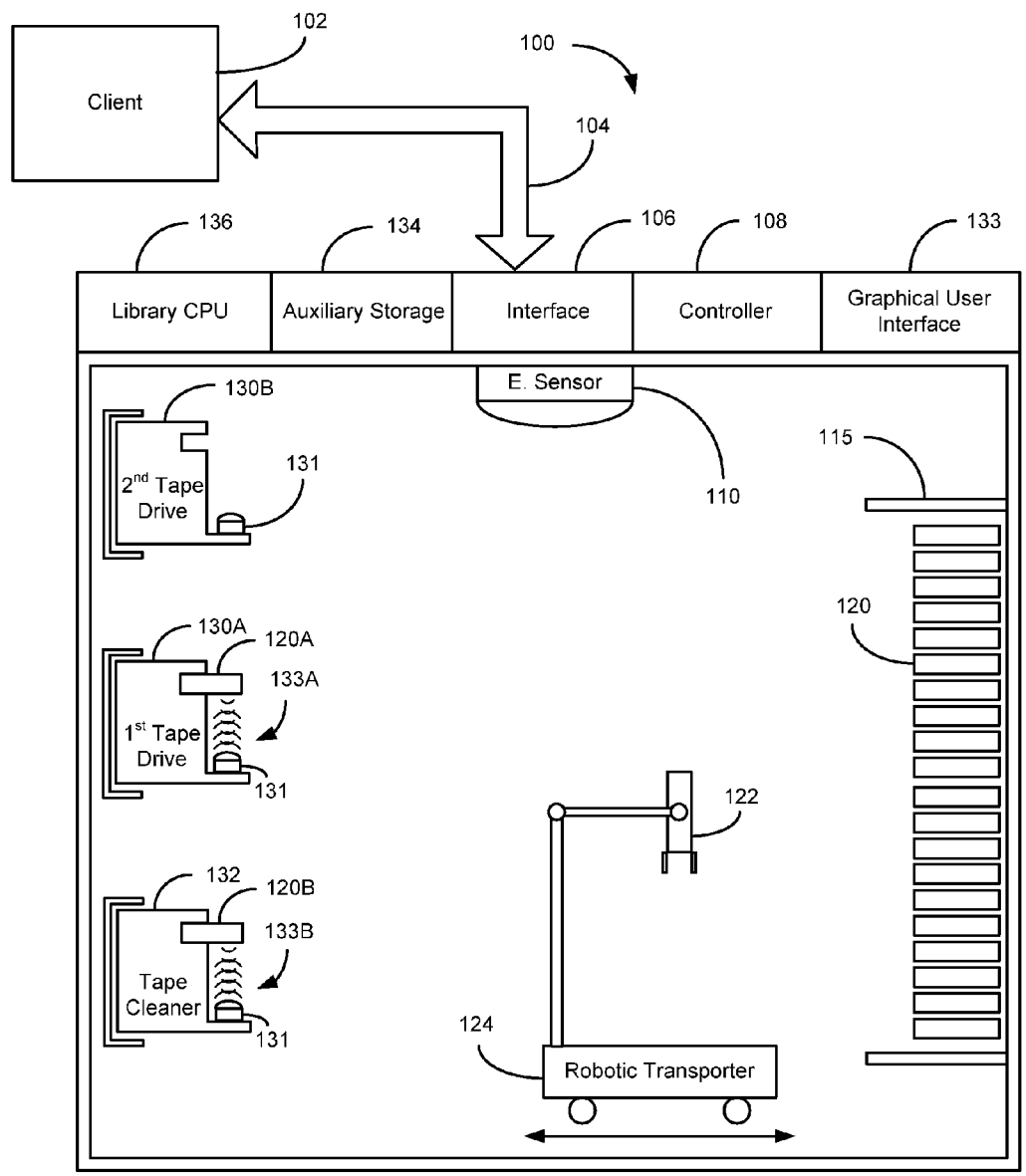
FIG. 1 is an illustration of a data storage arrangement constructed in accordance with certain embodiments of the present invention.

Referring to the drawings in general, and more specifically to FIG. 1, shown therein is an illustration of a data storage arrangement constructed in accordance with various embodiments of the present invention. In what follows, similar or identical structures may be identified using identical callouts.

The data storage arrangement illustrated in FIG. 1 can comprise a user of data 102, such as a client or host computer system, in communication with a data storage library 100. As illustratively shown, the client 102 is in communication with the library 100 via a communication path 104 and the library interface device 106. The library 100 comprises a plurality of tape cartridges 120 disposed in a shelf system 115, or optionally a plurality of portable magazines (not shown) whereby each magazine holds a plurality of tape cartridges 120 and is moveable around the library 100. Herein, tape cartridges 120 will be used to denote a generic tape cartridge with individual tape cartridges denoted with a suffix, such as A, B, C, etc. The shelf system 115 contains a plurality of slots (not shown) each adapted to accommodate a tape cartridge 120. Here, the library 100 may be configured to maintain a map of the slots in the shelf system 115. More specifically, each slot has a unique identification, such as an address, that can be mapped by a map system 108. A tape cartridge 120 disposed in a particular slot may assume the identity of the particular slot for purposes of the mapping system. Hence, a tape cartridge 120 disposed in a third slot whose address is mapped as slot number three may be made to assume the identity of slot number three. In other words, the tape cartridge will be mapped and identified as "slot number three" in this example. Optionally, a tape cartridge 120 can be simply identified by a serial number, or other indicia (such as a bar code, medium auxiliary memory information, etc.). Hence, a specific tape cartridge 120 that may be targeted for cleaning can be identified via the slot address and transported around the library 100 to the appropriate tape cartridge cleaning device 132.

The library 100 can further comprise at least one robotic transporter 124, though in optional embodiments, multiple transporters can exist. The robotic transporter 124 comprises a carriage or other means for transporting a tape cartridge 120 from the shelf system 115 to a position ready to load the tape cartridge 120 into a tape drive 130A or 130B (data transfer drives) or a tape cleaning device 132 (that is not a data transfer drive). Certain embodiments envision the tape cleaning device 132 being incapable of performing storage operations to tape medium 170, however some embodiment contemplate the tape cleaning device 132 being capable of performing storage operations to a Medium Auxiliary Memory (MAM) associated with the tape cartridge 120. With regards to the robotic transporter 124, some examples of a robotic transporter includes a robotic device that moves along a rail system via a belt device, a motorized rack and pinion arrangement, a lead screw arrangement, a motor with wheels, etc. Generically, a tape data transfer drive is denoted herein as element 130 and generically the tape cleaning device is denoted herein as element 132. A tape drive 130 is adapted to cooperate, or relate, with a tape cartridge 120 to perform storage related operations, such as reading and writing data from and to a tape cartridge 120. As shown, the tape cleaning device 132 (or optionally multiple tape cleaning devices) is entirely located internally within the tape library 100 and is adapted to clean the tape medium (not shown) that essentially resides in the tape cartridges 120. The tape cartridge 120 can be loaded into or removed from a tape drive 130 via a picker device 122, for example. Likewise, the picker device 122 is adapted to load or remove a tape cartridge 120 to and from slots in the shelf system 115. In certain embodiments, tape cartridges 120 may be associated with different users of data, which can occur when the storage resources (tape cartridges 120 and potentially tape drives 130) in the library 100 are divided into two or more partitions wherein each partition is associated with the different user of data, for example. The position ready to transfer the tape cartridge 120 into a tape drive 130 is a location that facilitates a picker to insert a tape cartridge 120 in one of the drives 130A or 130B, such as tape cartridge 120A shown in a cooperating relationship with the first tape drive 130A, without further movement of the transporter 124.

As further depicted, the library 100 provides at least one environmental sensor 110 (adapted to sample environmental conditions within the library 100), a graphical user interface 133 and an auxiliary memory 134, such as one or more disk drives, solid state memory or other non-volatile memory device/s, capable of retaining (storing) relevant information, such as history related information of each tape cartridge 120, for example. The library 100 further possesses a computer or Central Processing Unit (CPU) 136 that houses at least one macro-controller that actively cooperates with algorithms to orchestrate actions directed to components within the library 100, for example, over a Computer Area Network (CAN), not shown. The library 100 further possesses a controller system 108, which can optionally be functionally included with the CPU 136. The controller system 108 directs operations within the library 100 via addresses of the components mapped out for the client 102 and maintained in storage (i.e., tape slot addresses, drive addresses, robot addresses, etc.). FIG. 1 is illustrative of basic components used to exemplify inventive embodiments disclosed herein. As one skilled in the art will appreciate, a data storage library will generally include devices and structures not shown in the depicted block illustration of FIG. 1, such as additional controllers (i.e., those controlling other components in the library including the robotic transporter 124), wiring, cooling systems, switch systems, lighting, protocol bridges, etc.

The client 102, or host computer, identifies (or "sees") the components within the library 100 by transmitting a Small Computer Systems Interface (SCSI) inquiry to scan the storage system's bus (not shown) to discover what devices comprise the storage system 100. Optionally, the map system 108 can provide the information directly to the client 102. An inquiry can be a client 102 effectively asking the storage system 100 "who are you?" and "what are you?" The storage system 100 can be displayed showing a plurality of tape cartridges 100 located at specified slot addresses in the shelf system 115 and showing that there are two tape drives 130A and 130B at designated addresses and a transporter 124 and/or picker device 122 at designated addresses that are able to receive instructions from the client 102, for example. Optionally, the tape cleaning device 132 (or multiple tape cleaning devices) can be displayed to the client 102.

Figure 2A:
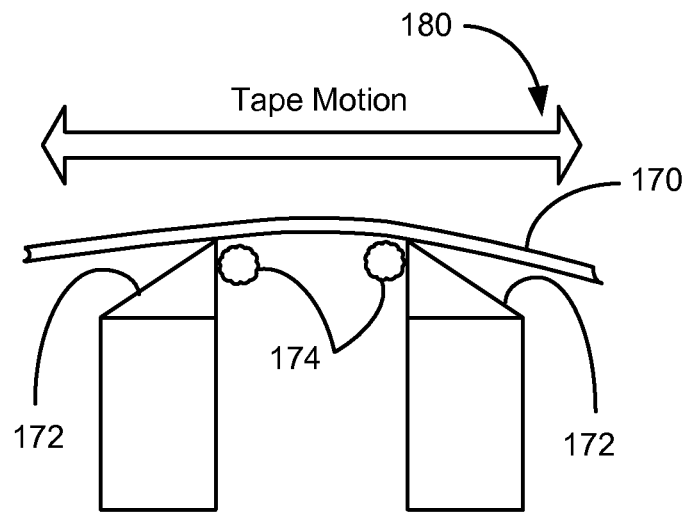
FIG. 2A is an illustration depicting essential cleaning components of a tape cleaner in the process of cleaning a tape medium in accordance with certain embodiments of the present invention.

FIG. 2A depicts the inner pertinent components in a tape cleaning device 132. Though, embodiments are described herein may be directed to carbide cleaning blades, other blades are contemplated such as diamond, diamond like carbon coated blades, and other blades that are wear resistant within the scope and spirit of the present invention. The embodiment depicts a recording tape medium 170, which comes wound inside of a tape cartridge 120, traversing over cleaning blades 172 along the length of the tape medium 170 in the directions as shown by the tape motion arrow 180. The cleaning blades 172 collect debris/contaminants 174 that accumulate on the tape medium 170. Primary sources of contaminants that can affect proper system operations include: (a) airborne contaminants, (b) tape cartridge 120 related, (c) tape drive 130 related, (d) tape media 170 related. Other than airborne and out-gassing sources, the remainder of the sources is related to physical motion of the tape media 170 and tape cartridge 120. More specifically, airborne contaminants include dust, human skin, food particles, water based contaminants (chlorine, sodium, etc), green house gases, etc. Cartridge related contaminants can include (a) out-gassing from plastic components used in the cartridge, (b) abrasive wear of the plastic reel inside the cartridge, (c) debris from the actuation of the hub lock, access door, and (d) wear of the cartridge shell being inserted, extracted from the drive or library setting, etc. Drive related contaminants may include wear components from (a) rollers and guides, (b) head materials, (c) abrasive wear of the take up reel, and (d) pretty much anything that comes into contact with the tape media itself while in motion, or relative motion. Media related contaminants can come from several sources, (a) tape slitting process, (b) loose debris after coating and processing, (c) HCA particles from tape being removed from the tape binder, (d) motion of the tape front side relative to the back side during winding and storage, (e) tension and tension variation resulting in loose particles becoming free to move about, (f) contact of the tape edge with tape guides, (g) contact of the tape edge with the flanges on the cartridge reel, take up reel in the drive, etc. The contamination, as described above, is a leading contributor to necessitate error correction using ECC when reading data off of the tape medium 170. Cleaning the tape medium 170 from debris and other contamination generated in part from extreme environmental conditions can add to the life and robustness of the tape medium 170, or more inclusively, the tape cartridge 120. A tape cartridge 120, as used herein by example, is intended to mean the entire tape cartridge 120 including the tape medium 170 that is comprised substantially in the tape cartridge 120. Hence, even though specifically tape media 170 is written to or is cleaned, for the purposes of simplicity, generically as used herein, a tape cartridge 120 is written to and, likewise, the tape cartridge 120 is cleaned. With continued reference to cleaning a tape cartridge 120, a tape cartridge cleaner 120 can incorporate (a) fibrous buffing surfaces, such as fabric or soft brushes that can be used in combination with liquid chemical cleaners, (b) ceramic waffle heads, (c) carbide cleaning heads, (d) ceramic knife blades, etc.

Figure 2B:
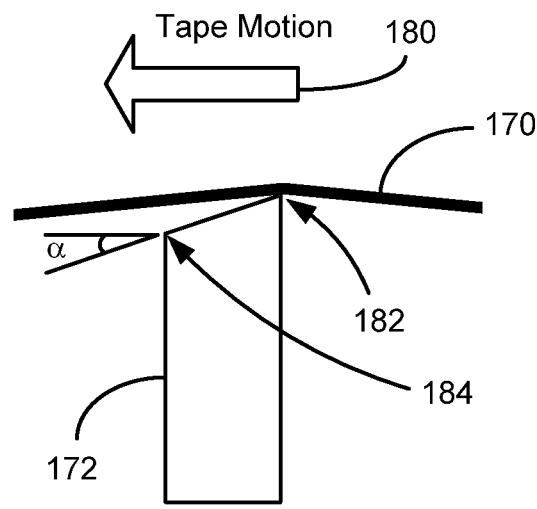
FIG. 2B is an illustration depicting a cleaning blade traversing the width of a magnetic tape in accordance with embodiments of the present invention.

FIG. 2B illustratively depicts a cleaning blade 172 with a tape medium 170 traversing over the bladed portion 182 in a contact or near contact manner in the tape motion indicated by the arrow 180. When the tape medium 170 is moved in the direction indicated by the arrow 180, debris is removed, "cleaned off", the tape medium 170 along the bladed edge 182. When the tape medium 170 is moved in the opposite direction from the arrow 180, an air film is generated between the tape medium 170 at the beveled edge 184 of the cleaning blade 172. This air film reduces the contact force between the tape medium 170 and the cleaning blade 172, thus making it possible for the tape medium 170 to lift tape off of the cleaning blade 172 to minimize contact to the tape medium 170 if desired, such as in a rewind operation. One embodiment contemplates the angle $\alpha$ of the cleaning blade 172 between $2°$ and $5°$, and more preferably $3°$. The angle $\alpha$ of the blade 172 depends on several parameters including tape speed and the tape tension, for example. Repeatedly used tapes cartridges may require repeated cleaning. The frequency of cleaning may depend one or more parameters, such as number of usages since last cleanings, data errors, elapsed time, and others.

Figure 3A:
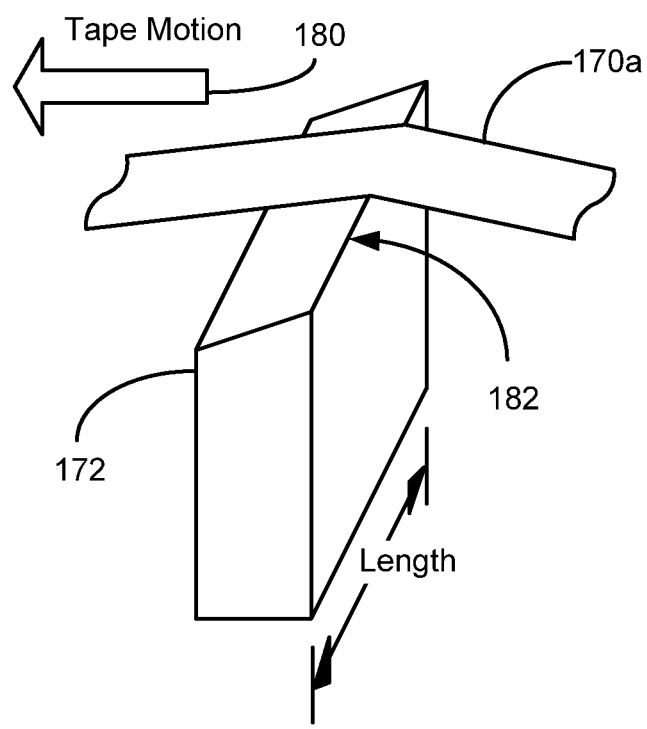
FIGS. 3A-3C depict illustrations of a cleaning blade that is positionally shifted during or between cleaning cycles of a tape medium consistent with certain embodiments of the present invention.
Figure 3B:
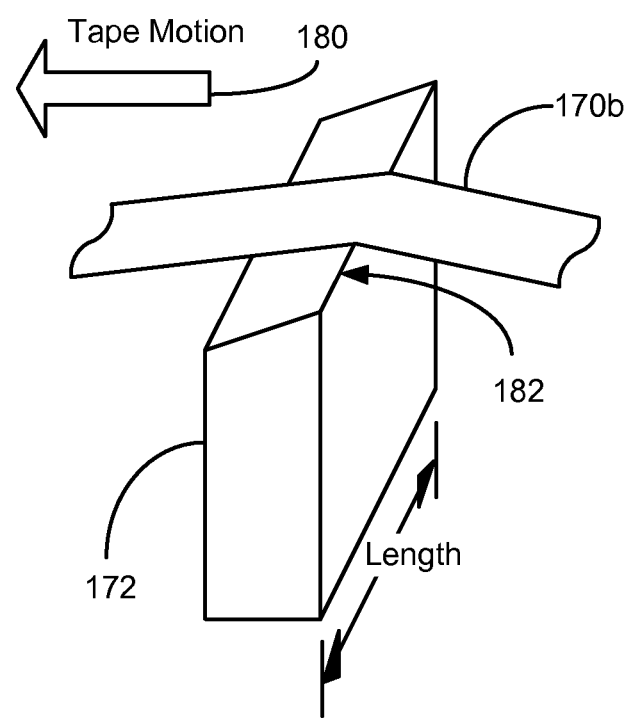
Figure 3C:
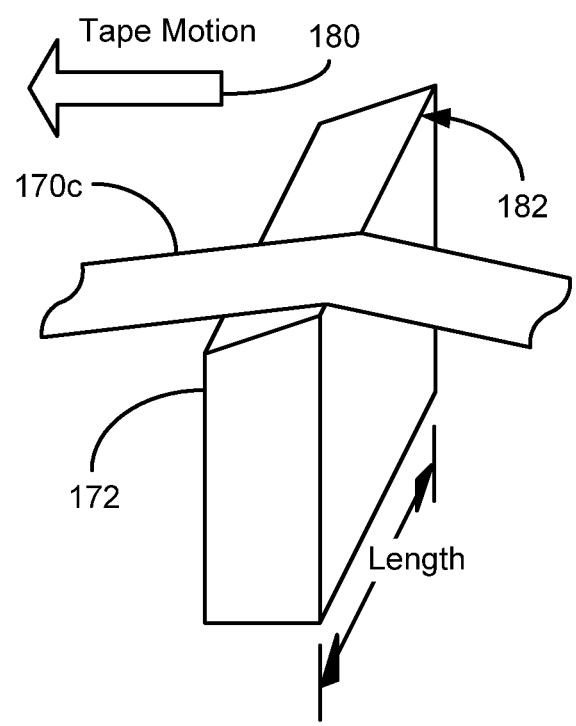

FIGS. 3A-3C illustrate embodiments wherein tape media 170a-c are positioned in different locations along the length of the cleaning blade 172. The cleaning blade 172 can be moved longitudinally to accommodate the tape media 170a-c in the different locations along the length of the cleaning blade 172. In one embodiment, a tape transport, or cleaning drive, comprises a cleaning blade 172 having a bladed edge 182 and a beveled edge 184 is mounted laterally to the tape medium 170, that is perpendicular to the cleaning blade 172 so that the flat surface of the tape medium 170 is in contact or near contact to the bladed edge 182 of the cleaning blade 172. In one embodiment, the cleaning blade 172 is mounted on an actuator (not shown) that is capable of moving the cleaning blade 172 in lateral direction to the tape medium 170. After completion of a tape cleaning cycle a brush (not shown) is brought in close contact to the cleaning blade 172, and more specifically, the bladed edge 182. The actuator moves the bladed edge 182 across the brush and collected debris is removed from the bladed edge 182. Cleaning devices other than a brush may used. For example, a cleaning device made from cloth or other suitable material may be used.

As depicted in FIG. 3A, a first tape medium 170a, from a first tape cartridge, is positioned towards the far end of the cleaning blade 172. As shown in FIG. 2B, in order to enhance the performance and life of a cleaning blade 172, a second tape medium 170b, from a second tape cartridge, is shifted towards the middle of the cleaning blade 172. And, likewise, as shown in FIG. 2C, a third tape medium 170c, from a third tape cartridge, is shifted towards the near end of the cleaning blade 172. In this embodiment, after the first tape medium 170a has been fully reeled across the bladed edge 182 (i.e., the length of the first tape medium 170a has been moved across the bladed edge 182 to be cleaned—FIG. 2A), the cleaning blade 172 is moved to accommodate the second tape medium 170b in a different location on the bladed edge 182 (FIG. 2B). Likewise, after the second tape medium 170b has been fully reeled across the bladed edge 182 (FIG. 2B), the cleaning blade 172 is moved to accommodate the third tape medium 170c in a different location on the bladed edge 182 (FIG. 2C). Moving the bladed edge 182 along a path in the direction of the length of the bladed edge can be accomplished by a number of ways known by those skilled in the art, e.g., a motor, actuator, etc.

In an optional embodiment, the cleaning blade 172 is moved in a different position every time a tape 170 is reeled over the bladed edge 182. For example, consider the first tape medium 170a being cleaned three times consecutively to make sure that the first tape medium 170a is satisfactorily cleaned. In this embodiment, the cleaning blade 172 is moved just like that which is shown in FIGS. 2A-2C, but with the same tape medium 170a being used in all three cleaning blade positions (FIGS. 2A-2C). For example, the first tape medium 170a traversing the bladed edge 182 in the first position depicted in FIG. 2A for the first pass, the first tape medium 170a traversing the bladed edge 182 in the second position depicted in FIG. 2B for the second pass, and the first tape medium 170a traversing the bladed edge 182 in the third position depicted in FIG. 2C for the third pass.

In yet another optional embodiment, the cleaning blade 172 is moved to a different position from FIG. 2A to FIG. 2C while just the first tape media 170a is being reeled across the bladed edge 182. For example, at the beginning of cleaning the first tape medium 170a, the cleaning blade 172 is in the first position shown in FIG. 2A. During the middle of the cleaning process of the first tape medium 170a, the cleaning blade is shifted to the second position shown in FIG. 2B. When the first tape medium 170a is essentially completing the cleaning process and is essentially fully traversed across the cleaning blade 172, the cleaning blade position is shifted to the third position shown in FIG. 2C. Some embodiments contemplate the shifting being a continuous smooth movement of the cleaning blade 172 from the first position (FIG. 2A) to the third position (FIG. 2C) while the tape medium 170 is being wound over the cleaning blade 172. Other embodiments contemplate the blade shifting from the first position (FIG. 2A) to the third position (FIG. 2C) and then back to the first position (FIG. 2A), etc., with a one tape medium 170 being cleaned in one cycle (one time).

The methods of shifting the cleaning blade 172 different locations provides certain benefits, such as reducing the potential of wear tracks forming in a single location in the bladed edge 182, thus improving the life of the cleaning blade 172. Moreover, shifting the position of the cleaning blade 172 relative to the tape medium 170 can improve the cleaning effectiveness based on debris build-up on the bladed edge 182.

Figure 4A:
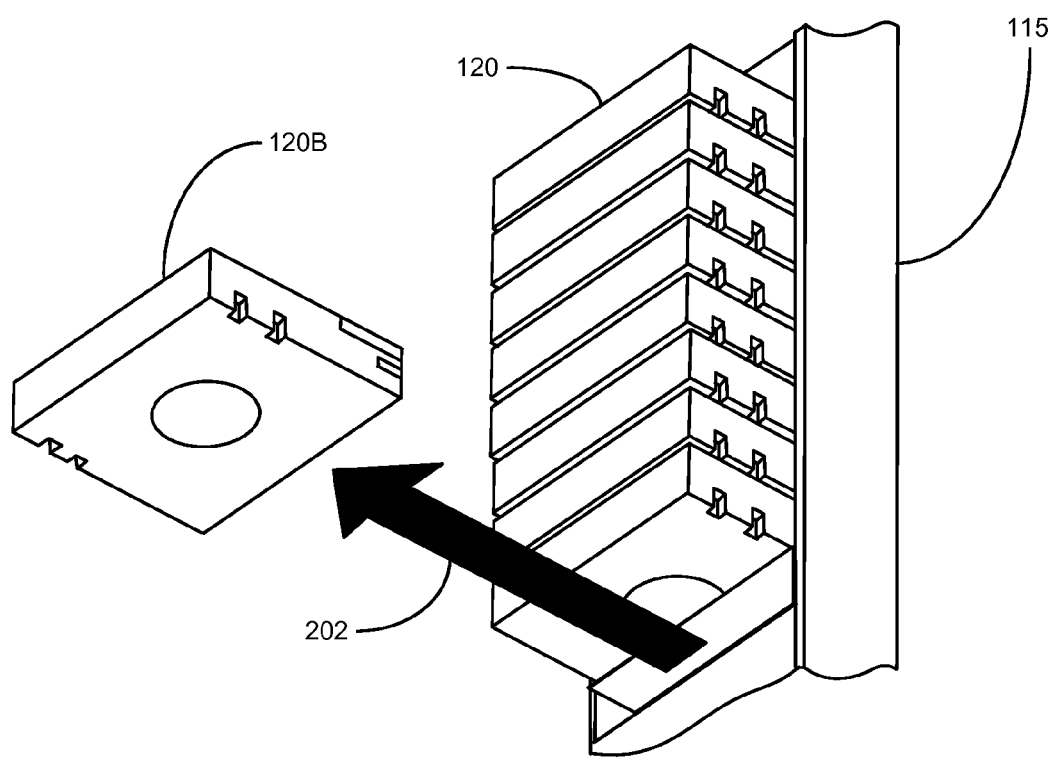
FIG. 4A shows a perspective illustration of a tape cartridge shelf system constructed in accordance with certain embodiments of the present invention.

Other embodiments contemplate a feedback system that has knowledge of the position of the cleaning blade 172 and a record, stored in memory, of former positions of the cleaning blade 172. Controlling the position of the cleaning blade 172 provides advantages of even wear across the cleaning blade 172. Examples of controlling the position of the cleaning blade 172 is to move the cleaning blade 172 after interacting with a known amount of linear tape media 170, such as moving every 100 ft, for example. Or, optionally, moving after a known amount of time e.g., every 30 seconds, or every 2 minutes, etc. The cleaning blade 172 can be a) moved a little bit at a time, or optionally, b) the width or more than the width of the tape medium 170. Retaining knowledge, such as in memory, of how much linear tape 170 has moved across the cleaning blade 172 can prompt when to replace or clean the cleaning blade 172. Coupled with knowledge of the position of the cleaning blade 172 with how much linear tape 170 has moved across the cleaning blade 172 can further enhance replacement or cleaning of the cleaning blade 172. Other embodiments contemplate changing or cleaning the cleaning blade 172 based on time in use. Other embodiments contemplate rotating the cleaning blade 172 to increase the angle $\alpha$ as the bladed edge 182 wears to essentially present an improved bladed edge 182 (surface) that confronts the tape medium 170, thus increasing the life of the cleaning blade 172 before replacing the cleaning blade 172. With reference to FIG. 4, depicted are tape cartridges 120 supported by a section of the shelf system 115. In more detail, a tape cartridge 120, such as an LTO-3 category tape cartridge, comprises magnetic tape that is capable of storing digital data written by a compatible tape drive 130, such as an LTO-3 tape drive, manufactured by IBM of Armonk, N.Y., when forming a cooperating relationship to read and write data (i.e. loaded) with the tape cartridge 120 as shown in FIG. 1. More specifically, a tape cartridge 120 is loaded in a tape drive 130 by being inserted in the tape drive 130 via an opening in the tape drive 130 whereby the tape drive 130 automatically draws the tape cartridge 120 therein to form the relationship that facilitates reading and writing data. The shelf system 115 is shown populated with a plurality of tape cartridges 120. A tape cartridge 120, in this case, a second tape cartridge 120B (used in the discussion later) can be removed from the shelf system 115, as shown by the arrow 202, by means of a picker device 122, shown in FIG. 1. In some embodiments, the tape cartridges 120 contain a Medium Auxiliary Memory (MAM) device (not shown), however, in alternative embodiments, some tape cartridges may not contain a MAM device. One example of a MAM device is a flash memory device that is activated by radio frequency, more or less a Radio Frequency Identification Device (RFID). The auxiliary memory device 134 can receive information that is maintained on the tape cartridge MAM devices contained via one or more MAM device readers/writers 131 associated with a tape drive 130, or an alternative MAM reader device separate from a tape drive 130, for example. Information from each MAM device can be stored on the auxiliary storage device 134, for example. Other embodiments contemplate a MAM reader and writer device 131 associated with the tape cleaning device 132. As shown here, the loaded tape drive 130A is in radio frequency communication 133 with the auxiliary radio frequency memory device 104 (not shown) associated with tape cartridge 201 via the tape drive radio frequency memory device 230 associated with tape drive 224.

A MAM device, in certain embodiments, is parceled into three regions in which data can be stored: a medium device region which contains information such as a serial number (or some information corresponding to a tape's bar code, for example), a device region which can contain information from the tape drive such as load count or error detection tallies, and host/vendor unique region wherein information such as history and/or performance data related to the cartridge 120 can be stored. The information in the regions can be supplemented to with new information via an address related to the arrangement of available storage space in the cartridge MAM device or, optionally, the information can be read by an auxiliary memory reader, i.e., a MAM reader, and reassembled with additional information and stored on the MAM device as the reassembled version, just to name two examples. In another example, if the storage limit is reached in the MAM device, such as the host/vendor data in the host/vendor unique region, the host/vendor data can be read and stored in an auxiliary storage space, such as the auxiliary memory 134, and the host/vendor unique region can be purged and made available for new information. In another example, the host/vendor data can be compressed in the MAM, or elsewhere, whereby the library 100 can be arranged to decompress the compressed host/vendor data, for example.

Figure 4B:
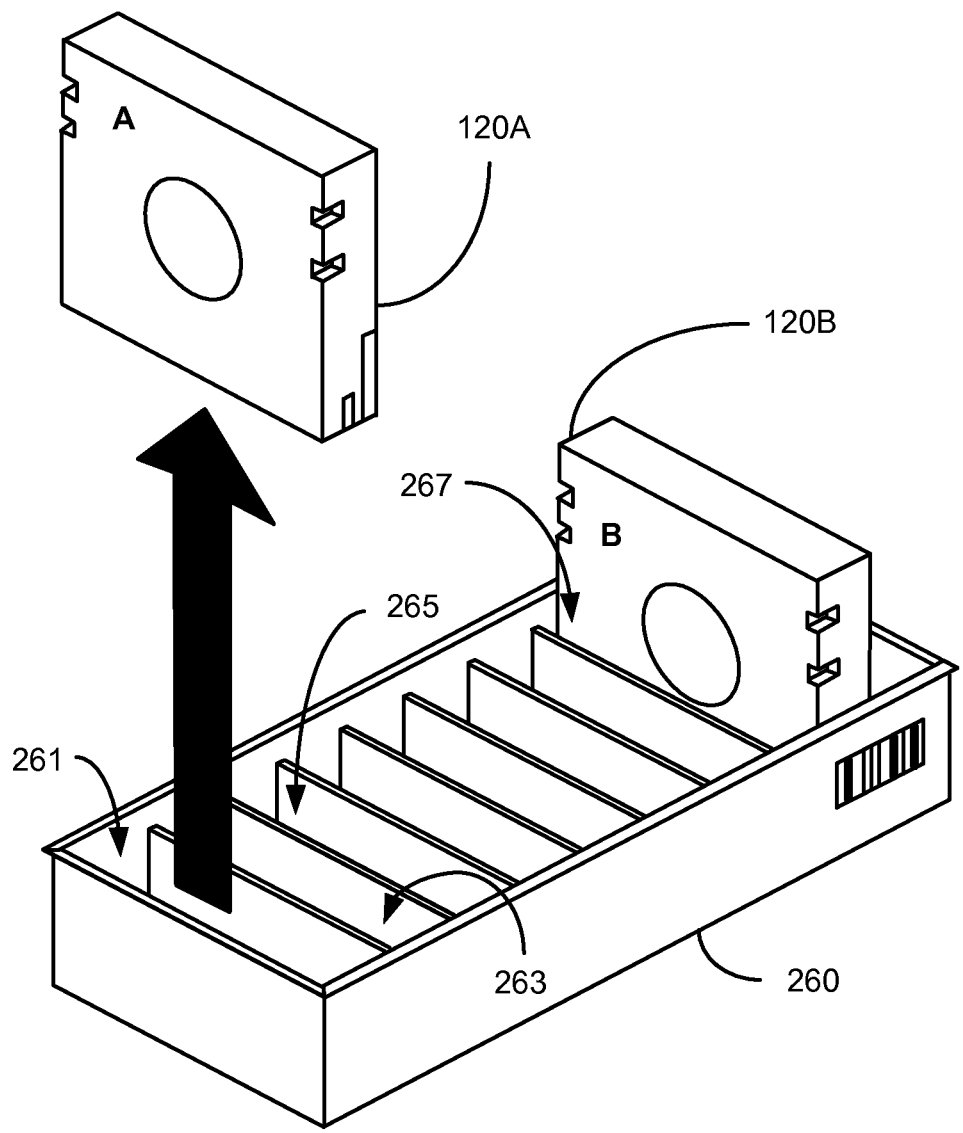
FIG. 4B depicts a perspective illustration of a tape cartridge magazine constructed in accordance with certain embodiments of the present invention.

FIG. 4B depicts an embodiment of a mostly empty tape cartridge magazine 260 consistent with embodiments of the present invention. Here, in one exemplary embodiment, the magazine 260 possesses a plurality of slots 261, 263, 265, and so on. The depicted magazine 260 can be mapped to a client 102 as possessing slots one through nine. The tape cartridge "A" 120A originated from the first slot 261 and, therefore, is also mapped to correspond to the first slot 261 address, or more specifically, the tape cartridge 120A with an address associated with the first slot 261. Tape cartridge "B" 120B is the only other tape cartridge shown in FIG. 2B and is disposed in the eighth slot 267.

Figure 5:
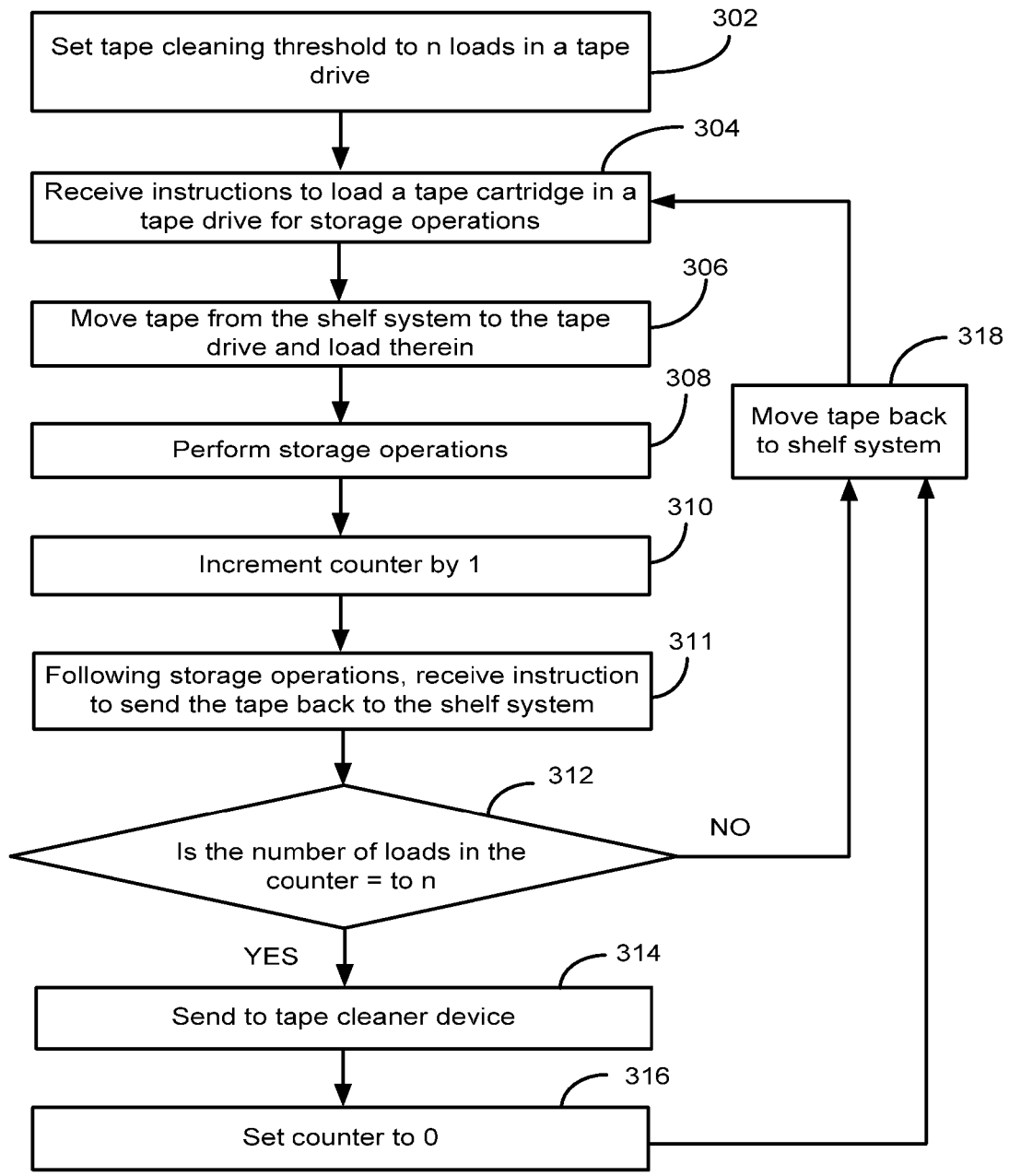
FIG. 5 is a block diagram of a cleaning method based load count in accordance with an embodiment of the present invention.

FIG. 5 depicts an embodiment of a method for cleaning a tape cartridge 120 after the tape cartridge 120A has been loaded a number of times in one or more tape drives 130. FIG. 5 is described in conjunction with the tape cartridge library of FIG. 1. It should be recognized that the steps presented in the described embodiments of the present invention do not necessarily require any particular sequence unless otherwise stated. For ease of explanation, the below embodiment will follow a single tape cartridge 120A. With reference to step 302, a counter is set to a fixed number of load events 'n' for the particular tape cartridge 120A. The threshold number of load events 'n' serves as a maximum number of load events before an action to clean the tape cartridge 120A is triggered. Hence, if 'n' is set to five load events, when the counter is incremented to five load events, an action to clean the tape cartridge 120A is triggered. A load event is defined herein when one of the tape cartridges 120 is loaded in one of the tape drives 130 to form a cooperating read/write relationship (performing storage operations). The counter (not shown) can be a standalone device, but is more preferably, a register, such as a bit field in non-volatile storage, that is incremented, or updated, by a processor each time a load event occurs. In this way, a tally of load events can be maintained and accessed to compare against a limit, or threshold, of number of allowable loads. The counter can be maintained by the auxiliary storage 134, the library CPU storage 136, a MAM device comprised by the tape cartridge 120, or a combination thereof, just to name several examples. In step 304, instructions are received to load the tape cartridge 120A in a target tape drive 130A in order to perform storage operations. Certain embodiments contemplate the instructions are received by the host 102. Based on the instruction of step 304, the tape cartridge 120A is moved from the shelf system 115 to the target tape drive 130A, such as by the robotic transporter 124 and picker device 122, and loaded in the target tape drive 130A, as shown in step 306. In step 308, storage operations are performed on the tape cartridge 120A via the tape drive 130A. Accordingly, as shown in step 310, the counter associated with the tape cartridge 120A is incremented by one load event. Hence, if the tape cartridge 120A is loaded in the tape drive 130A for the first time, the counter will be registered to indicate one load event, but if the tape cartridge 120A is loaded for a second time, say in tape drive 130B, the counter will be registered to indicate two load events. In certain embodiments, the tape drive 130A will update the load event to a register in the MAM associated with the tape cartridge 120A via an RF transmission 133A, as shown in FIG. 1. After storage operations are complete, the host 102 will instruct the library 100 to move the tape cartridge 120A back to the shelf system 115, step 311. Step 312 shows a decision as to whether the number of loads has reached the fixed number of load events 'n'. If 'yes' then send the tape cartridge 120A to the tape cleaner 132, if 'no' then move the tape cartridge 120A back to the shelf system 115, step 318. In some embodiments, if the decision is 'no', then the instruction to move the tape cartridge 120A back to the shelf system 115 is queued and the host 102 is informed that the instruction has been carried out, even though in reality the instruction has not been carried out. This is done to coax the host 102 in sending further storage related instructions for other tape cartridges 120. If 'yes' then the tape cartridge 120A is sent to the tape cleaner device 132 for cleaning, step 314. After the tape 120A has been sent for cleaning, the counter, or counters, associated with the tape cartridge 120A is set to zero and the tape cartridge 120A is moved back to the shelf system 115.

Certain optional embodiments related to the description of the method depicted in FIG. 5 contemplate a separate counter that keeps track of how many times a tape cartridge 120 has been cleaned over its life time. The separate counter can be maintained in the auxiliary storage 134, the library CPU storage 136, a MAM device comprised by the tape cartridge 120, or a combination thereof, just to name several examples. A record of this nature may be used to restore all data contents from the tape cartridge 120A to a new tape cartridge 120C, effectively replacing the heavily cleaned tape cartridge 120A. Hence, if the tape cartridge 120A is set to thirty life-time cleanings and the tape cartridge 120A reaches the thirty life-time cleanings, the data from that tape cartridge 120A is restored on a new or other used tape cartridge 120C and the old tape cartridge 120A disposed of.

Other optional embodiments that can be related to the description of the method depicted in FIG. 5 and other methods described below contemplate tailoring load count thresholds for one or a group of tape cartridges 120 in a library 100. For example, in certain embodiments, all of the tape cartridges 120 in the library 100 are set to the same number of load counts. Other embodiments contemplate setting tape cartridges 120 from one library partition to a different number of threshold load counts from tape cartridges 120 in a different library partition. Yet other embodiments contemplate setting the counter for each tape cartridge 120 according to a common tape cartridge magazine, which holds a plurality of tapes cartridges 120 therein. Hence, for example, all tape cartridges 120 in magazine-A are set to five load events, but all tape cartridges 120 in magazine-B are set to ten load events. Likewise, load count thresholds can be set according to shelves in a shelf system 115, groups of shelves, library cabinet modules (a library can be comprised of multiple library cabinets), etc.

Other optional embodiments that can be related to the description of the method depicted in FIG. 5 and other methods described below contemplate optional ways of setting the load count thresholds for one or a group of tape cartridges. For example, in certain embodiments, an operator can set the load count threshold via the graphical user interface 133. Other embodiments contemplate an end user or host 102 setting the load count via communication with the library 100. Yet other embodiments contemplate inputting the load count to the MAM of a tape cartridge 120 by an OEM prior to shipping the tape cartridge 120 to an end user. Certain embodiments contemplate a default load count that automatically sets tape cartridge thresholds in a library via the library 100 (more specifically via algorithms stored in non-volatile memory executed by a processor).

Figure 6:
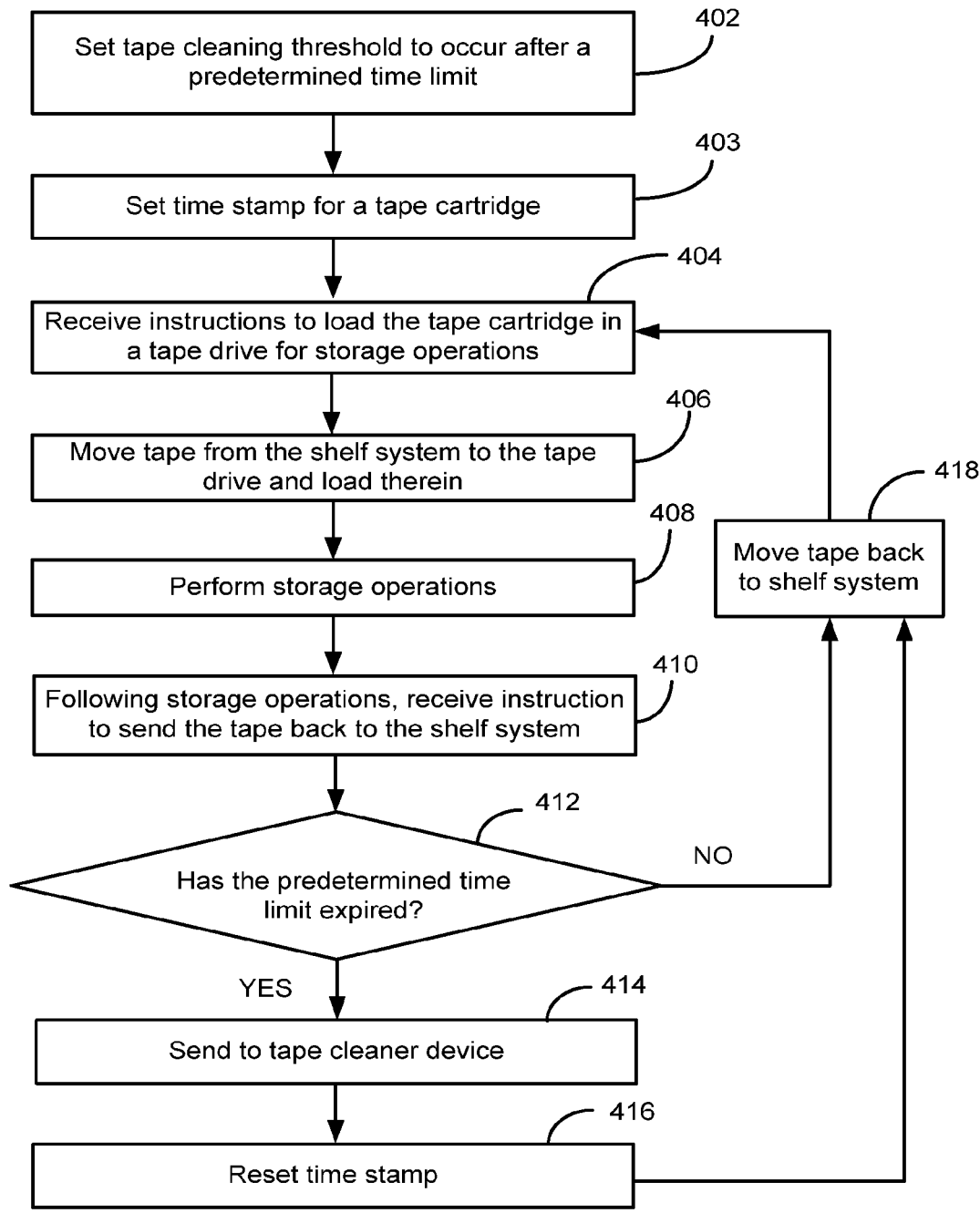
FIG. 6 is a block diagram of a cleaning method based a time limit in accordance with an embodiment of the present invention.

FIG. 6 depicts an embodiment of a method for cleaning a tape cartridge 120 after a predetermined time limit is reached. FIG. 6 is described in conjunction with the tape cartridge library of FIG. 1. For ease of explanation, the below embodiment will follow a single tape cartridge 120A. With reference to step 402, a time limit is set to when a particular tape cartridge 120A is scheduled to go through a cleaning process. Hence, if the time limit is set to every three months, then when the time limit is reached, an action to clean the tape cartridge 120A is triggered. A timing scheme can include a standalone device, but is more preferably, a start time is stored in a register, such as a bit field in non-volatile storage, that is compared against a digital clock, such as that set by the library 100 or the library CPU 136 or some other clock associated with the library 100 that, in some cases, runs on auxiliary power, and is thus immune to power outages or glitches. The time threshold can be maintained by the auxiliary storage 134, the library CPU storage 136, a MAM device comprised by the tape cartridge 120, or a combination thereof, just to name several examples. As shown in step 403, the time stamp from when time is initialized for the tape cartridge 120A is set. This can be accomplished by storing the start from when time is accounted for the tape cartridge 120A, which can be stored on the tape cartridge's MAM or some other storage device mentioned previously. The time stamp setting the time to T=0 can be the time when the tape cartridge 120A is first introduced to the library 100, when the library 100 is first turned on, when the tape cartridge 120A is first loaded in a tape drive 130, or some other starting point that is chosen by the library 100, the host 102, an operator, etc. In step 404, instructions are received to load the tape cartridge 120A in a target tape drive 130A in order to perform storage operations. Certain embodiments contemplate the instructions are received by the host 102. Based on the instruction of step 404, the tape cartridge 120A is moved from the shelf system 115 to the target tape drive 130A, such as by the robotic transporter 124 and picker device 122, and loaded in the target tape drive 130A, as shown in step 406. In step 408, storage operations are performed on the tape cartridge 120A via the tape drive 130A. After storage operations are complete, the host 102 will instruct the library 100 to move the tape cartridge 120A back to the shelf system 115, step 410. Step 412 shows a decision as to whether the time limit is reached. If 'yes' then send the tape cartridge 120A to the tape cleaner 132, if 'no' then move the tape cartridge 120A back to the shelf system 115, step 418. In some embodiments, if the decision is 'no', then the instruction to move the tape cartridge 120A back to the shelf system 115 is queued and the host 102 is informed that the instruction has been carried out, even though in reality the instruction has not been carried out. If 'yes' then the tape cartridge 120A is sent to the tape cleaner device 132 for cleaning, step 414. After the tape 120A has been sent for cleaning, the time stamp associated with the tape cartridge 120A is reset to start over again and the tape cartridge 120A is moved back to the shelf system 115.

Certain optional embodiments that can be related to the description of the method depicted in FIG. 6 and other methods described herein contemplate a separate time tracking means that keeps track of when a tape cartridge 120 has been cleaned. The separate time accounting can be operated by the CPU 136, an independent processing unit (not shown), a dedicated processing device (not shown), and a processing unit in another device, such as a tape drive 130, just to name several examples. The time stamp data (the starting point from when the time is initialized that is used to compare when the time limit is reached) can be maintained in the auxiliary storage 134, the library CPU storage 136, a MAM device comprised by the tape cartridge 120, or a combination there of, just to name several examples.

Certain optional embodiments that can be related to the description of the method depicted in FIG. 6 and other methods described herein contemplate tailoring time thresholds for one or a group of tape cartridges 120 in a library 100 in a way similarly discussed in conjunction with FIG. 5.

Other optional embodiments related to the description of the method depicted in FIG. 6 contemplate optional ways of setting the time thresholds for one or a group of tape cartridges 120. For example, in certain embodiments, an operator can set the time threshold via the graphical user interface 133. Other embodiments contemplate an end user or host 102 setting the time thresholds via communication with the library 100. Yet other embodiments contemplate inputting the time thresholds to the MAM of a tape cartridge 120 by an OEM prior to shipping the tape cartridge 120 to an end user. Other embodiments contemplate a default time threshold that automatically sets tape cartridges in a library via the library 100 (more specifically via algorithms stored in non-volatile memory executed by a processor).

In yet other optional embodiments related to the description of the method depicted in FIG. 6 contemplate optional ways to instigate cleaning a tape cartridge or group of tape cartridges 120. For example, a date and/or time from when a tape cartridge 120 was last cleaned can be displayed to an operator via the graphical user interface 133, or via a message to a user of data with a recommendation that cleaning is recommended.

Figure 7:
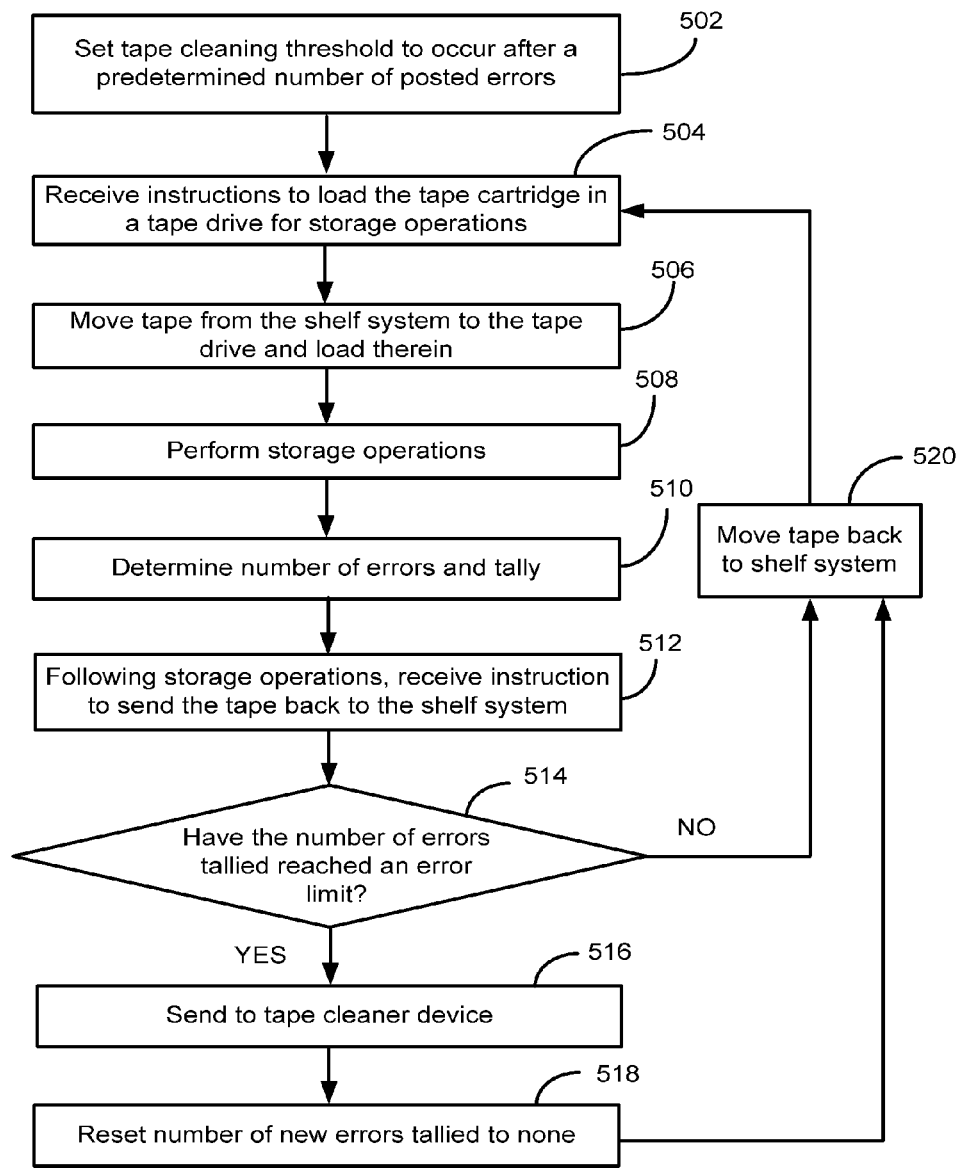
FIG. 7 is a block diagram of a cleaning method based a limit of tape error detections in accordance with an embodiment of the present invention.

FIG. 7 depicts an embodiment of a method for cleaning a tape cartridge 120 after a predetermined error limit is reached. FIG. 7 is described in conjunction with the tape cartridge library of FIG. 1. For ease of explanation, the below embodiment will follow a single tape cartridge 120A. With reference to step 502, a tape cleaning threshold is set to occur after a predetermined number of posted error detections. Error detection and correction are generally employed for both write errors and read errors. Because a tape drive is inherently susceptible to read and write errors, often due to spacing perturbations caused by debris, corrections "on the fly" with minimal impact on throughput performance by using embedded error correction code (ECC) and corresponding ECC processing (checksum) routines are typically used. ECC is, generally speaking, a cyclic redundancy code, such as, but not necessarily limited to, Reed-Solomon code. Hence, an elevated number of error detections relative to what is "deemed" normal may be in indicator that the tape cartridge 120A needs cleaning. Such an elevated number of error detections can be used to set the threshold for posted error detections. In step 504, instructions are received to load the tape cartridge 120A in a target tape drive 130A in order to perform storage operations. Certain embodiments contemplate the instructions are received by the host 102. Based on the instruction of step 504, the tape cartridge 120A is moved from the shelf system 115 to the target tape drive 130A, such as by the robotic transporter 124 and picker device 122, and loaded in the target tape drive 130A, as shown in step 506. In step 508, storage operations are performed on the tape cartridge 120A via the tape drive 130A. During reading and writing operations, a tally of error detections is recorded and maintained in storage/non-volatile memory, such as the auxiliary storage 134, the library CPU storage 136, a MAM device comprised by the tape cartridge 120, or a combination there of, just to name several examples, step 510. After storage operations are complete, the host 102 will instruct the library 100 to move the tape cartridge 120A back to the shelf system 115, step 512. Step 514 shows a decision as to whether the number of errors detected has reached the threshold error limit. If 'yes' then send the tape cartridge 120A to the tape cleaner 132, if 'no' then move the tape cartridge 120A back to the shelf system 115, step 418. In some embodiments, if the decision is 'no', then the instruction to move the tape cartridge 120A back to the shelf system 115 is queued and the host 102 is informed that the instruction has been carried out, even though in reality the instruction has not been carried out. If 'yes' then the tape cartridge 120A is sent to the tape cleaner device 132 for cleaning, step 516. Certain embodiments contemplate the predetermined limit of errors detected is based on a tally of error detections made during a present storage operation with the tape cartridge 120A in addition to a history of error corrections of the tape cartridge 120A, a cumulative record of error detections that is retained in non-volatile storage. After the tape 120A has been sent for cleaning, the tally of errors from the different loads, (or in an extreme case, one load) associated with the tape cartridge 120A and at least one of the plurality of tape drives 130, is reset to start over again (i.e., set to zero) and the tape cartridge 120A is moved back to the shelf system 115.

Certain optional embodiments that can be related to the description of the method depicted in FIG. 7 and other methods described herein contemplate a separate error detection tracking means that keeps track of when a tape cartridge 120 has been cleaned. The separate error detection accounting can be accomplished by the CPU 136, an independent processing unit (not shown), a dedicated processing device (not shown), and a processing unit in another device, such as a tape drive 130, just to name several examples. The error detection data can be maintained in the auxiliary storage 134, the library CPU storage 136, a MAM device comprised by the tape cartridge 120, or a combination there of, just to name several examples. Certain optional embodiments that can be related to the description of the method depicted in FIG. 7 and other methods described herein contemplate tailoring error detection thresholds for one or a group of tape cartridges 120 in a library 100 in a way similarly discussed in conjunction with FIG. 5.

Other embodiments related to the description of the method depicted in FIG. 7 contemplate optional ways of setting the error detection thresholds for one or a group of tape cartridges 120. For example, in certain embodiments, an operator can set the error detection threshold via the graphical user interface 133. Other embodiments contemplate an end user or host 102 setting the error detection thresholds via communication with the library 100. Yet other embodiments contemplate inputting the error detection thresholds to the MAM of a tape cartridge 120 by an OEM prior to shipping the tape cartridge 120 to an end user. Other embodiments contemplate a default error detection threshold that automatically sets tape cartridges in a library via the library 100 (more specifically via algorithms stored in non-volatile memory executed by a processor).

Other embodiments related to the description of the method depicted in FIG. 7 contemplate optional ways of retaining a record of the errors detected over the life of a tape cartridge 120. For example, a record of all errors detected for a specific tape cartridge 120, independent of the detected errors that are reset to zero after cleaning, is retained in at least one of the plurality of storage locations discussed. This may be useful to discard, or replace (by transferring data to a new tape cartridge 120), a tape cartridge 120 if the number of detected errors over the life of the tape cartridge 120 exceeds an overall error limit. It is contemplated that the record of all errors detected be maintained in at least one of the already mentioned storage devices.

Other embodiments related to the description of the method depicted in FIG. 7 contemplate optional errors detection limits that when triggered causes tape cartridges 120 in a proximal region to be cleaned. For example, if several tape cartridges 120 have high error detection rates than the typical tape cartridge 120 in a library 100, then all the tape cartridges 120 in proximity are sent to be cleaned. This may be due to an isolated particulate contamination problem or a something that outgases, for example. The proximal regions are contemplated to be on a common shelf in a shelf system 115, in a common tape cartridge magazine, in a common library cabinet unit (whereby a library 100 may have a plurality of cabinets or shelf modules), or optionally a whole library unit.

Figure 8:
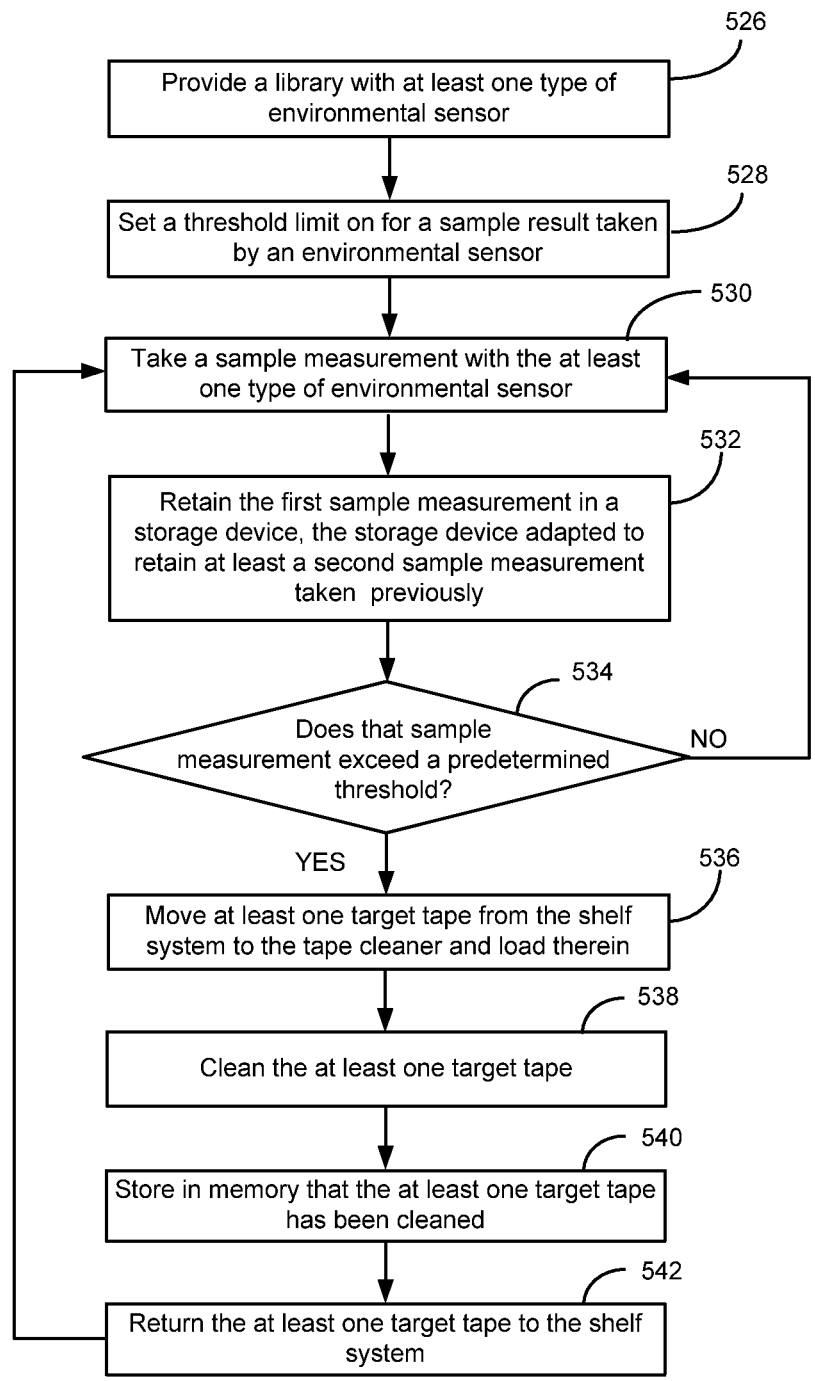
FIG. 8 is a block diagram of a cleaning method in accordance with an embodiment of the present invention.

FIG. 8 depicts an embodiment of a method for cleaning a tape cartridge 120 based on environmental conditions. FIG. 8 is described in conjunction with the tape cartridge library of FIG. 1. It should be recognized that the steps presented in the described embodiments of the present invention do not necessarily require any particular sequence unless otherwise stated. With reference to step 526, a tape library 100 is provided with at least one type of environmental sensor 110. As shown in step 528, for one or more target tape cartridges 120, an environmental limit is set for at least one sample result taken by the environmental sensor 110. The target tape cartridges 120 can be those for a specific customer who may designate different specified environmental limits than another customer. Optionally, the target tape cartridges 120 can be those from a certain region in the library 100 or all tape cartridges 120 in the library 100, just to name several examples. As shown in step 530, at least one sample measurement is taken, via the sensor 110. As shown in step 532, the sample measurement is retained in a storage device, such as the auxiliary storage 134, for example. Other sample storage embodiments envision a disk drive, flash or other non-volatile storage device either in or outside of the library 100, MAM other storage devices comprised by a tape cartridge 120, for example. Certain embodiments contemplate additional sample measurements previously residing in the storage device when the sample measurement is taken. Step 534 shows a decision as to whether the sample measurement exceeds the predetermined threshold set in step 528. If the sample measurement does not exceed the predetermined threshold, then continue monitoring the chosen environmental condition/s in step 530. If the sample measurement exceeds the predetermined threshold, then move the target tape cartridge/s 120 from the shelf system 115 to the tape cleaning device 132 that is located within the tape library 100, step 536. As shown in step 538, the target tape cartridge/s 120 are cleaned via the tape cleaning device 132. Store in memory that the target tape cartridge/s 120 have been cleaned, step 540, and return the cleaned tape cartridge/s 120 back to the shelf system 115, step 542. Continue to take sample measurements. Certain embodiments contemplate storing the cleaning events in memory comprised by the library 100, such as in the auxiliary storage device 134, while other embodiments contemplate storage of each tape cartridge 120 being retained in memory comprised by the tape cartridge 120, such as on the MAM or the tape media itself. Such information can be used to gain an understanding of what tape cartridges 120 have been cleaned, when they were cleaned, how many times they were cleaned, and the reasons why the tape cartridges 120 were cleaned.

Certain embodiments directed to step 526 contemplate that the sensor 110 may be functionally equipped to sense one or more conditions, such as temperature, relative humidity, airborne particles, airborne chemicals, shock and vibration, for example. For example, the sensor 110 may be adapted to measure just temperature, or optionally, just temperature and humidity, or optionally a plurality of the different environmental conditions discussed. Certain embodiments contemplate a plurality of environmental sensing devices 110 each adapted to sense a different condition located in specific places in the library 100 to optimize what is being sensed (for example, a shock and vibration sensor at points where the library 100 rests on a floor). Though many kinds of off-the-shelf sensors exist to measure the for the aforementioned environmental conditions, examples of sensors include thermal couples for a temperature sensing, light diffuser and particle laser sensors for taking particle counts, or gas spectrometers to measure out of range chemical contamination for different chemicals, such as airborne acids, or other noxious chemicals (e.g., rubberizers, something burning, organic chemicals, etc.), or piezo-electric crystals for shock and vibration, for example. The environmental conditions can be continuously sensed and sent through a data acquisition system, such as a data acquisition board and memory device that could reside in the CPU 138, or elsewhere. Sample rates of environmental data can vary depending on the memory and reasonable system requirements (for example, temperature and humidity may only be measured in multiples of seconds while vibration and shock may be monitored at milliseconds). The data acquisition system can be useful in developing trends, such as rate of temperature change over a certain period of time. The data acquired from the environmental sensor 110 can be stored in memory comprised by the library 100, externally, or optionally on a location in each the tape cartridge 120, such as on the associated tape medium or in a MAM or in another memory device comprised by the tape cartridge 100 (i.e., a different solid state memory).

With regards to step 528 (setting a threshold limit for one or more samples taken from the environmental sensor) certain embodiments contemplate threshold limits set for one or more target tape cartridges 120 in a common group. For example, the common group might be a group of tape cartridges 120 designated to a specific library partition, to a specific region of the library 100, to high priority tape cartridges 120, to a specific tape cartridge, or to all of the tape cartridges 120 within the library 100. Certain embodiments contemplate the threshold limit as a sample that has exceeded a predetermined limiting value, while other embodiments contemplate the threshold limit being based on multiple samples, such as that which validate or corroborate one or more sample values. Optionally, certain embodiments contemplate threshold limits as trends from multiple samples taken, i.e., temperature rising over time or sustained vibration over a period of time.

Figure 9:
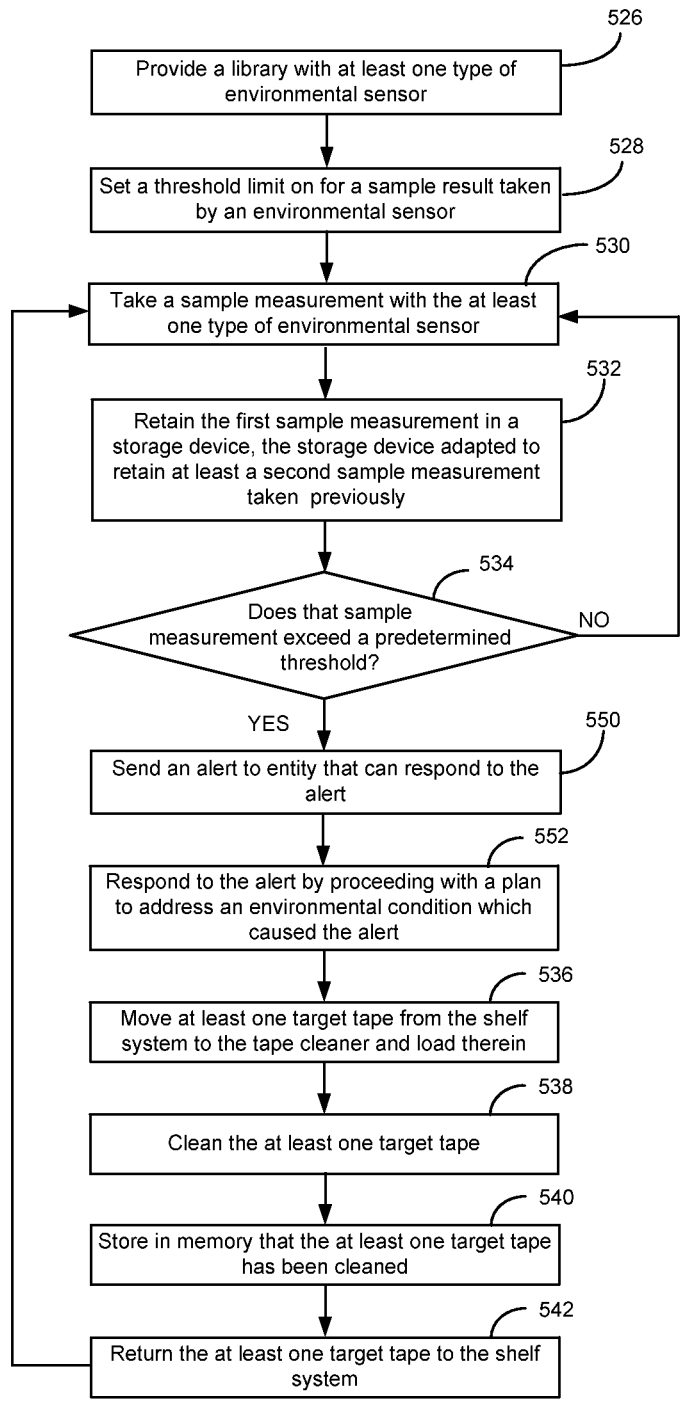
FIG. 9 is a block diagram of a cleaning method in accordance with an embodiment of the present invention.

With regards to the decision of step 534, whereby a sample measurement (or measurements) triggers a cleaning response, some embodiments contemplate automatically putting cleaning steps into motion, while other embodiments contemplate sending an alert recommending progressing to the cleaning step 312 to an entity that is in control of responding to the cleaning alert, such as an end user, client, Original Equipment Manufacturer (OEM), or operator (see step 550 in FIG. 9). In embodiments where tape cartridges 120 are automatically cleaned based on the preset criteria (threshold/s, target tape/s, etc.), an entity can be the recipient of what tape cartridges 120 have been cleaned and why, while other embodiments contemplate that an entity must request what tape cartridge/s have been cleaned and why. In embodiments where cleaning steps are recommended (alert) based on environmental conditions being triggered by predetermined environmental threshold being reached but are not automatically carried out, an entity can initiate the cleaning process with regards to a plan of action to address the environmental condition which caused the alert. Such a plan of action may include addressing the cause for triggering the alert before cleaning the tape cartridges 120 by a) cleaning the library 100 if the environmental condition which caused the alert is particle related, or b) resolving an out of range temperature or humidity problem, or c) fixing a library 100 that may have undergone extreme shock and/or vibration, for example (see step 552 in FIG. 9). In this way, the tape cartridges 120 will not be re-exposed to the same conditions that triggered a cleaning alert in the first place. After addressing the reason why a library 100 might have triggered an alert, tape cartridge cleaning can be initiated by inputting that information via the GUI 133, over a web-based line, etc.

In yet another optional embodiment of the present invention, a tape cartridge can be made to be cleaned if a predetermined reason for cleaning is when a new tape cartridge is determined to have been subjected to an unfavorable occurrence prior to being introduced to the tape cartridge library, such as during shipping, wherein the unfavorable occurrence includes extreme temperature, extreme pressure, extreme humidity, extreme shock, extreme vibration, wherein extreme is defined by that which is beyond specifications set for the tape cartridges. Such an occurrence can be monitored with sensors capable of retaining environmental information that are with the tape cartridges during shipping. Such sensors are further envisioned to be actively powered and provide the ability to download their data to a computing system for analysis of their data. Downloading can be accomplished through wire-line or wirelessly, such as via a RFID technology, for example.

Figure 10A:
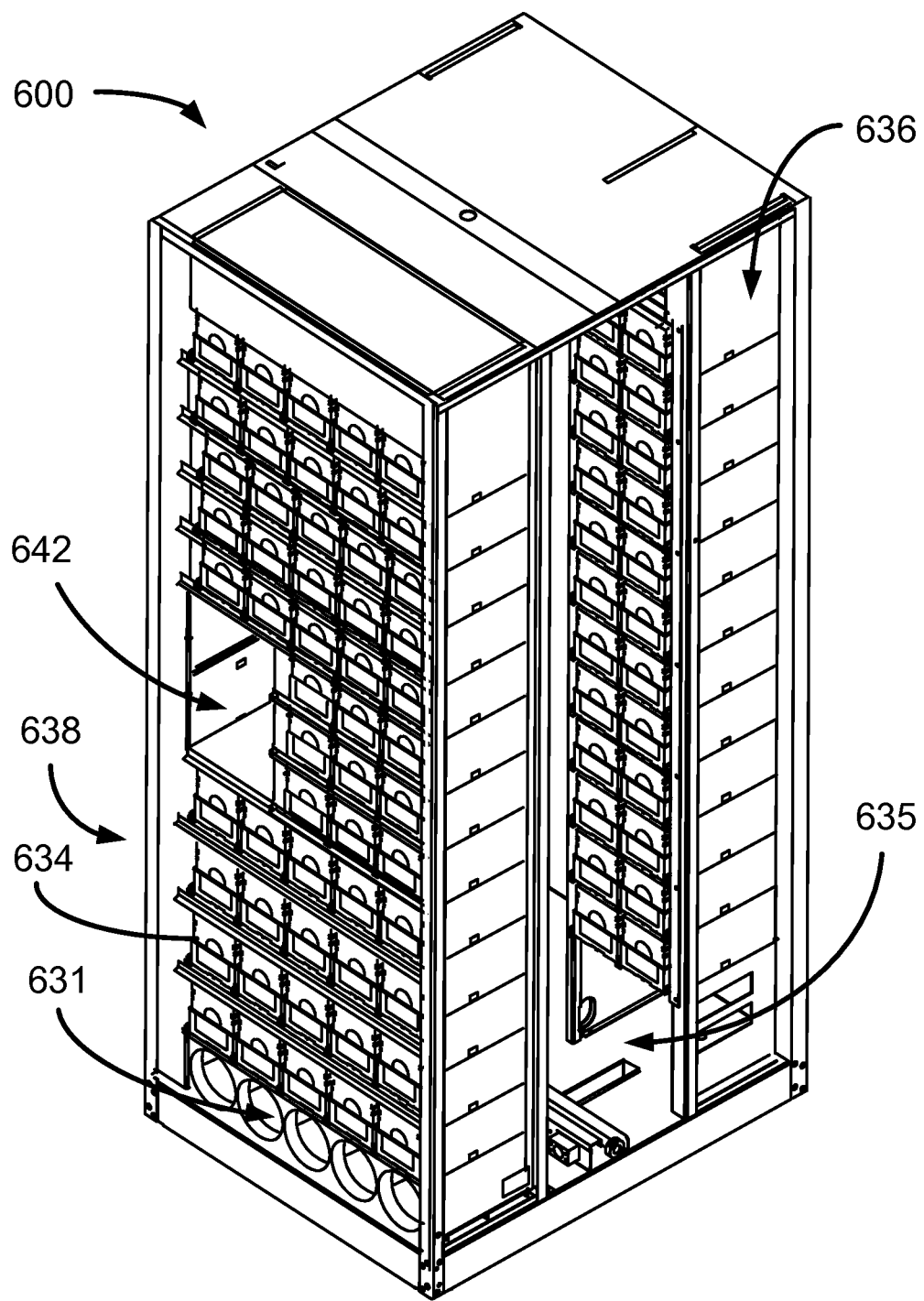
FIGS. 10A-10B are illustrations depicting a T-950 library cabinet in accordance with an embodiment of the present invention.
Figure 10B:
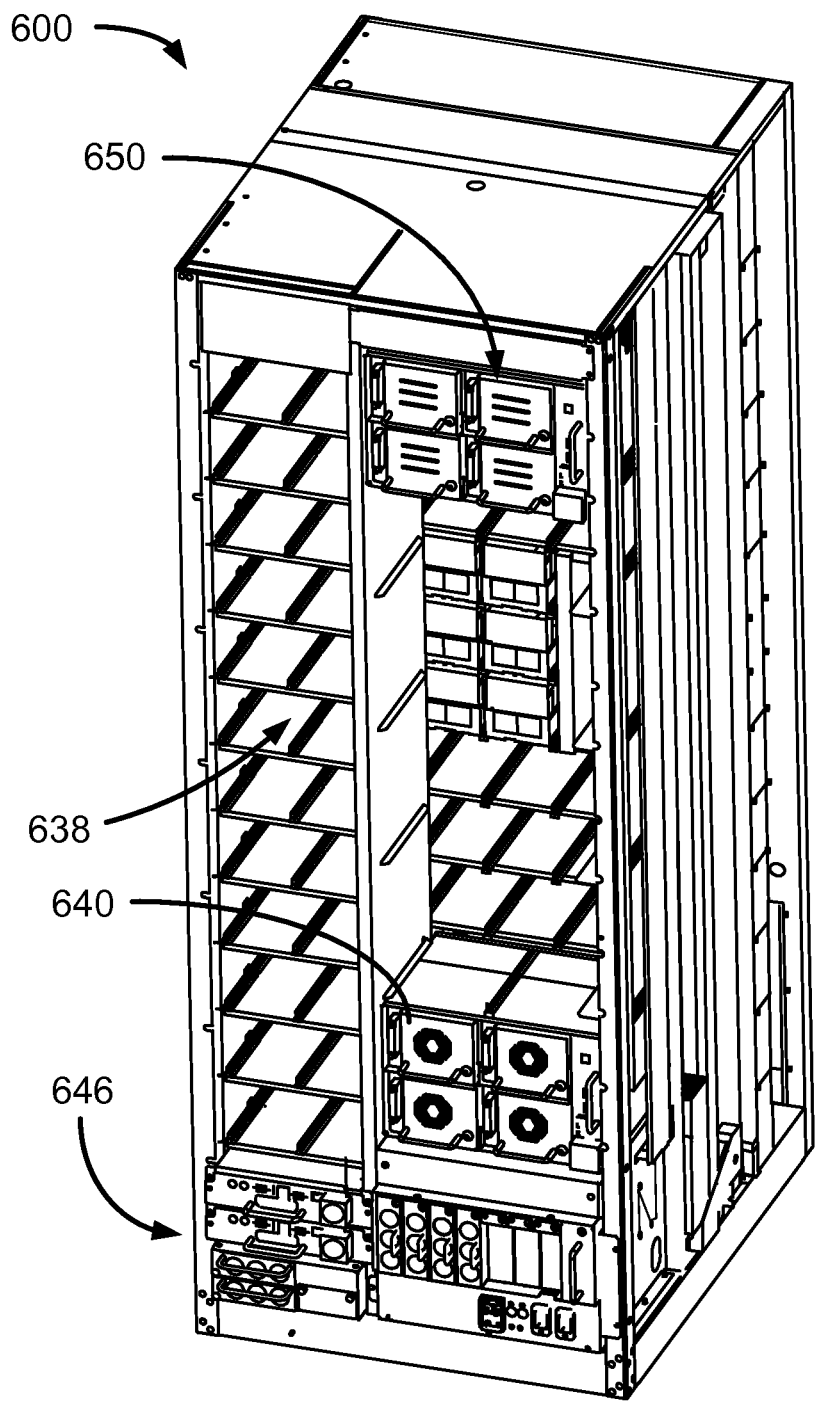

Embodiments of the present invention can be commercially practiced in a Spectra Logic T-950 tape cartridge library manufactured by Spectra Logic of Boulder Colo. FIGS. 10A and 10B show a commercial embodiment of one T-950 library cabinet/unit 100 (FIG. 1) without an enclosure. The T-950 library 600 comprises a first and second shelf system 302, 304 that are adapted to support a plurality of the mobile media, such as the magazine 108 (FIG. 1) holding a plurality of LTO-3 tape cartridges 106 with MAMs, archived by the library 600. The shelf systems 636, 638 can each have at least one auxiliary memory reader. Disposed next to the second shelf system 638 are at least four IBM LTO-3 tape drives 640 adapted to write data to and read data from a tape cartridge 120. The IBM LTO-3 tape drives 640 each have the capability of storing data to an auxiliary radio frequency memory device contained in an LTO-3 tape cartridge 120. Functionally interposed between the first and second shelf system 636, 638 is a magazine transport space 635. The magazine transport space 635 is adapted to provide adequate space for a magazine 634 to be moved, via the transport unit 124 (FIG. 11), from a position in the first shelf system 636, for example, to a tape drive 640. The transport unit 124 can further accommodate at least one auxiliary radio frequency memory device reader. Magazines 634 can be transferred into and out from the T-950 library 600 via the entry/exit port 642. Transferring magazines 634 in and out of the T-950 library 600 can be accomplished by an operator, for example. The T-950 library 600 comprises a means for cooling as shown by the fans 631, located at the base of the library 600. The T-950 library 600 can be linked to a central data base, providing control in storage of all of the auxiliary radio frequency memory devices contained in each tape cartridge 120 in the T-950 library 600 as read by any one of the auxiliary radio frequency memory device readers. The T-950 library 600 also comprises a library controller (not shown) that can function as the processor device in addition to an auxiliary storage device, such as a disk drive (or plurality of disk drives). The library 600 further possesses a CPU system and interface 646. The T-950 library 600 also provides a graphical user interface (not shown) whereon a display of assessment results or, in alternative embodiments, simple messages can be displayed pertaining to a user-specified action associated with a tape cartridge 120 such as an alert accompanying a sound alarm or recommendations for further action/s, for example. The library 600 also illustratively shows a bank of four cleaning drives 650, such as that which can be supplied by Applied Engineering Science, Inc., of Eastlake Colo., that each comprise a carbide blade cleaning system.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple, or all tape drives in a library, can be managed in the tape cleaning processes for example, while still maintaining substantially the same functionality without departing from the scope and spirit of the claimed invention. Another example can include using these techniques across multiple library partitions, while still maintaining substantially the same functionality without departing from the scope and spirit of the claimed invention. Further, though communication is described herein as between a client and the library, such as the library 100, communication can be received directly by a tape drive, via the interface device 102, for example, without departing from the scope and spirit of the claimed invention. Further, for purposes of illustration, a first and second tape drive and tape cartridges are used herein to simplify the description for a plurality of drives and tape cartridges. Finally, although the preferred embodiments described herein are directed to tape drive systems, and related technology, it will be appreciated by those skilled in the art that the claimed invention can be applied to other systems, without departing from the spirit and scope of the present invention.

It will be clear that the claimed invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed invention disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A tape cartridge library comprising:
   a plurality of tape cartridges each possessing a magnetic tape medium;
   a plurality of tape drives each adapted to form a cooperating relationship with one of said tape cartridges to perform storage operations;
   at least one environmental sensor adapted to sample an environmental condition within said tape cartridge library;
   at least one tape cleaning drive incapable of transferring data to and from said magnetic tape media, said tape cleaning drive independent of the plurality of data transfer drives, the tape cleaning drive disposed entirely within the tape cartridge library, wherein the tape cleaning drive automatically receives said tape cartridges and cleans the possessed magnetic tape medium when said sample of said environmental condition exceeds a predetermined threshold.

2. The tape cartridge library of claim 1 wherein said at least one environmental sensor is a temperature sensor that senses temperature in said tape cartridge library and wherein said predetermined threshold includes both a high temperature and a low temperature.

3. The tape cartridge library of claim 1 wherein said at least one environmental sensor is a humidity sensor that senses relative humidity in said tape cartridge library, said predetermined threshold is based on a humidity level that exceeds a predetermined humidity level threshold.

4. The tape cartridge library of claim 1 wherein said at least one environmental sensor is a particle sensor that senses the number of particles in said tape cartridge library, said predetermined threshold is based on a particle count that exceeds a predetermined particle count threshold.

5. The tape cartridge library of claim 1 wherein said at least one environmental sensor is a chemical sensor that senses the chemical types and amounts in said tape cartridge library, said predetermined threshold is based on excessive quantities of identified types of chemicals in said tape cartridge library.

6. The tape cartridge library of claim 1 wherein said at least one environmental sensor is a shock sensor that senses the shock in said tape cartridge library, said predetermined threshold is based on an excessive shock value.

7. The tape cartridge library of claim 1 wherein said at least one environmental sensor is a vibration sensor, said predetermined threshold is based on excessive vibration sensed by said vibration sensor.

8. The tape cartridge library of claim 1 wherein said at least one environmental sensor is a pressure sensor, said predetermined threshold is based on a pressure that is out of a predetermined range.

9. The tape cartridge library of claim 1 wherein a new tape cartridge is made to be cleaned when introduced to said tape cartridge library if said new tape cartridge has been subjected to an unfavorable environmental condition from being shipped.

10. The tape cartridge library of claim 9 wherein said unfavorable environmental condition includes predetermined parameters that are beyond an acceptable range, said predetermined parameters include: temperature, pressure, humidity, shock, vibration.

11. The tape cartridge library of claim 9 wherein said unfavorable environmental condition is sensed via a sensor and converted as data that is retained in a storage device that can be accessed by a computing system.

12. The tape cartridge library of claim 1 wherein said tape cleaning drive possesses a ceramic blade that cleans said tape media by physically scraping said tape media.

13. A method comprising:
providing a tape cartridge library possessing: a plurality of tape cartridges each containing a recording tape medium, a plurality of data transfer drives arranged to perform storage operations with the recording tape medium, at least one tape cleaning drive that is incapable of performing storage operations with the recording tape medium wherein the tape cleaning drive is entirely confined within the tape cartridge library, and at least one environmental sensor adapted to sample an environmental condition within said tape cartridge library;
sensing an out of range environmental condition within said tape cartridge library via said environmental sensor;
based on said out of range environmental condition, initiating a cleaning routine whereby said recording tape media from said plurality of tape cartridges are cleaned via said tape cleaning drive.

14. The method of claim 13 wherein each of said tape cartridges possess a medium auxiliary memory device, said method further comprising retaining a record of said cleaning for each of said recording tape medium in a medium auxiliary memory device associated with said respective tape cartridge.

15. The method of claim 13 wherein said environmental sensor is adapted to sense from a group comprising one or more of: temperature, humidity, number of particles, chemistry of molecules, shock, vibration and pressure.

16. The method of claim 13 further comprising an end user setting threshold values that establish said out of range environmental condition.

17. The method of claim 13 wherein said tape cleaning drive possesses a ceramic blade that cleans said tape media by physically scraping said tape media.

18. A method comprising:
providing a tape cartridge library possessing: a first tape cartridge containing a first recording tape medium and a second tape cartridge containing a second recording tape medium, a plurality of data transfer drives arranged to perform storage operations with the first and the second recording tape medium, at least one tape cleaning drive that is incapable of performing storage operations with the first or the second recording tape medium wherein the tape cleaning drive is entirely confined within the tape cartridge library, and at least one environmental sensor adapted to sample at least one environmental condition within said tape cartridge library;
sensing an out of range environmental condition within said tape cartridge library via said environmental sensor;
based on said out of range environmental condition, initiating a cleaning routine whereby said first recording tape medium from said first tape cartridge is cleaned via said tape cleaning drive;
retaining knowledge that said first tape cartridge is cleaned in an auxiliary memory device comprised by said first tape cartridge.

19. The method of claim 18 wherein said knowledge contains date and or time of when said first recording tape medium was cleaned.

20. The method of claim 18 further comprising prior to initiating said cleaning routine, a user of data is provided with a message to recommend cleaning based on said out of range environmental condition.

* * * * *